United States Patent
Mouri et al.

(10) Patent No.: US 10,442,342 B2
(45) Date of Patent: Oct. 15, 2019

(54) VEHICULAR HEADLAMP SYSTEM AND CONTROL METHOD OF VEHICULAR HEADLAMP FOR FORMING A PATTERN ON A ROAD SURFACE

(71) Applicants: TOYOTA JIDOSHA KABUSHIKI KAISHA, Toyota-shi (JP); KOITO MANUFACTURING CO., LTD., Minato-ku (JP)

(72) Inventors: Fumihiko Mouri, Owariasahi (JP); Yusuke Nakada, Shizuoka (JP); Yoshiyuki Nakanishi, Shizuoka (JP)

(73) Assignees: TOYOTA JIDOSHA KABUSHIKI KAISHA, Toyota-shi (JP); KOITO MANUFACTURING CO., LTD., Minato-ku (JP)

( * ) Notice: Subject to any disclaimer, the term of this patent is extended or adjusted under 35 U.S.C. 154(b) by 241 days.

(21) Appl. No.: 15/363,731

(22) Filed: Nov. 29, 2016

(65) Prior Publication Data
US 2017/0158112 A1   Jun. 8, 2017

(30) Foreign Application Priority Data
Dec. 8, 2015   (JP) .................................. 2015-239430

(51) Int. Cl.
*G08B 21/00* (2006.01)
*B60Q 1/08* (2006.01)
(Continued)

(52) U.S. Cl.
CPC .............. *B60Q 1/085* (2013.01); *B60Q 1/04* (2013.01); *B60Q 1/50* (2013.01); *B60Q 1/525* (2013.01);
(Continued)

(58) Field of Classification Search
CPC . B60Q 1/04; B60Q 1/085; B60Q 1/50; B60Q 1/525; F21S 41/125; F21S 41/36; F21S 41/675
(Continued)

(56) References Cited

U.S. PATENT DOCUMENTS

| 2007/0285939 | A1* | 12/2007 | Tachibana | F21S 41/255 362/509 |
| 2008/0043481 | A1* | 2/2008 | Yokoyama | F21S 41/675 362/465 |

(Continued)

FOREIGN PATENT DOCUMENTS

| DE | 10 2006 050 548 A1 | 4/2008 |
| EP | 2 450 736 A1 | 5/2012 |

(Continued)

*Primary Examiner* — Mark S Rushing
(74) *Attorney, Agent, or Firm* — Oblon, McClelland, Maier & Neustadt, L.L.P.

(57) ABSTRACT

A vehicular headlamp system includes: a pair of right and left headlamp units; and a road surface drawing unit provided in the headlamp units, the road surface drawing unit being configured to emit first light so as to form a first light distribution pattern and to emit second light so as to form a second light distribution pattern, such that a predetermined drawing pattern is drawn on a road surface, the drawing pattern being configured such that the first light distribution pattern and the second light distribution pattern are adjacent to each other or the first light distribution pattern and the second light distribution pattern at least partially overlap each other, and the first light and the second light being set in a relationship of complementary colors.

20 Claims, 6 Drawing Sheets

(51) Int. Cl.
*B60Q 1/04* (2006.01)
*B60Q 1/50* (2006.01)
*B60Q 1/52* (2006.01)
*F21S 41/125* (2018.01)
*F21S 41/36* (2018.01)
*F21S 41/675* (2018.01)
*F21Y 113/10* (2016.01)
*F21S 41/147* (2018.01)
*F21S 41/255* (2018.01)
*F21S 45/47* (2018.01)
*F21S 41/365* (2018.01)

(52) U.S. Cl.
CPC ............ *F21S 41/125* (2018.01); *F21S 41/36* (2018.01); *F21S 41/675* (2018.01); *B60Q 2300/05* (2013.01); *B60Q 2400/50* (2013.01); *F21S 41/147* (2018.01); *F21S 41/255* (2018.01); *F21S 41/365* (2018.01); *F21S 45/47* (2018.01); *F21Y 2113/10* (2016.08)

(58) Field of Classification Search
USPC .......................................................... 340/468
See application file for complete search history.

(56) References Cited

U.S. PATENT DOCUMENTS

| | | | |
|---|---|---|---|
| 2012/0075878 A1* | 3/2012 | Sato | B60R 1/00 362/538 |
| 2013/0058116 A1* | 3/2013 | Galbas | B60Q 1/085 362/512 |
| 2014/0313755 A1 | 10/2014 | Tanaka | |
| 2015/0211703 A1* | 7/2015 | Nakazawa | B60Q 1/085 362/514 |
| 2015/0219298 A1* | 8/2015 | Mollers | F21S 41/19 362/520 |
| 2015/0224926 A1* | 8/2015 | Mochizuki | B60R 1/00 701/36 |
| 2016/0039286 A1* | 2/2016 | Shibata | B60K 35/00 701/36 |
| 2017/0043705 A1* | 2/2017 | Mizuno | F21S 41/25 |

FOREIGN PATENT DOCUMENTS

| | | |
|---|---|---|
| JP | 2005-71731 A | 3/2005 |
| JP | 2014-216049 | 11/2014 |
| JP | 5669212 B2 | 2/2015 |
| JP | 2015-138763 | 7/2015 |
| JP | 2015-153057 A | 8/2015 |
| JP | 2015-164828 | 9/2015 |
| JP | 2015-205572 A | 11/2015 |
| KR | 10-2015-0113431 A | 10/2015 |
| WO | WO 2015/159599 A1 | 10/2015 |

* cited by examiner

FIG. 4
|   | RIGHT ROAD SURFACE DRAWING UNIT | LEFT ROAD SURFACE DRAWING UNIT |
|---|---|---|
| 1 | BLUE | YELLOW |
| 2 | GREEN | MAGENTA |
| 3 | CYAN | RED |
FIG. 5
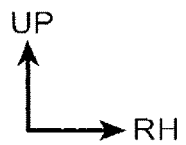
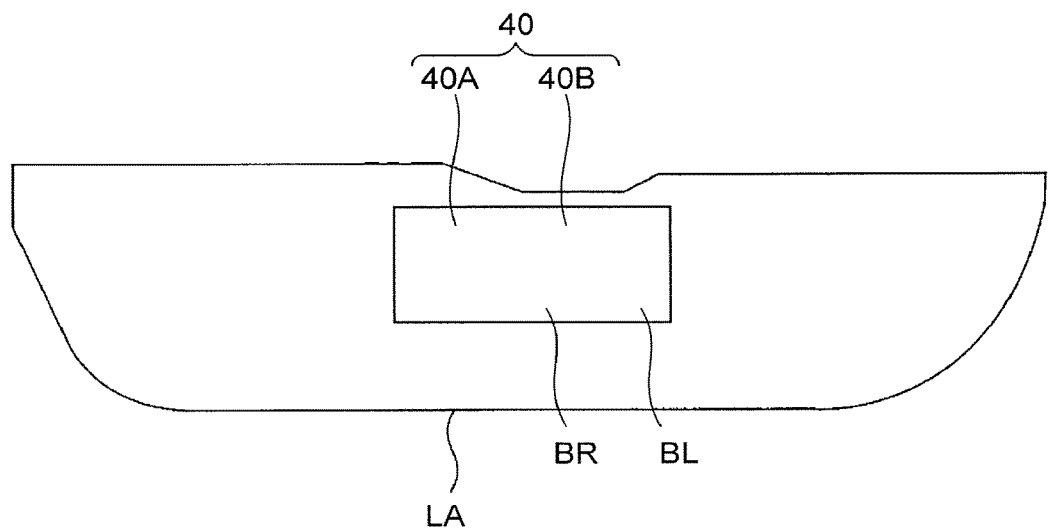

VEHICULAR HEADLAMP SYSTEM AND CONTROL METHOD OF VEHICULAR HEADLAMP FOR FORMING A PATTERN ON A ROAD SURFACE

INCORPORATION BY REFERENCE

The disclosure of Japanese Patent Application No. 2015-239430 filed on Dec. 8, 2015 including the specification, drawings and abstract is incorporated herein by reference in its entirety.

BACKGROUND

1. Technical Field

The present disclosure relates to a vehicular headlamp system and a control method of a vehicular headlamp.

2. Description of Related Art

A vehicular headlamp described in Japanese Patent Application Publication No. 2015-138763 (JP 2015-138763 A) is configured to emit radiated light from a laser and to draw a predetermined drawing pattern around a vehicle. Further, the vehicular headlamp includes a light source that can change colors of the radiated light. Accordingly, colors of the drawing pattern can be changed by changing the colors of the radiated light to be emitted. This makes it possible to improve visibility of the drawing pattern.

SUMMARY

However, in the vehicular headlamp, although the colors of the drawing pattern are changed, there is no description about a specific color to improve the visibility of the drawing pattern. In view of this, there is room for improvement in that the visibility of the drawing pattern is further improved.

The present disclosure provides a vehicular headlamp system that can improve visibility of a drawing pattern and a control method of a vehicular headlamp.

A vehicular headlamp system of a first aspect includes: a pair of right and left headlamp units provided in a front end portion of a vehicle; and a road surface drawing unit provided in at least one of the pair of right and left headlamp units, the road surface drawing unit being configured to emit first light so as to form a first light distribution pattern and to emit second light so as to form a second light distribution pattern, such that a predetermined drawing pattern is drawn on a road surface on a front side relative to the vehicle by the first light distribution pattern and the second light distribution pattern, the drawing pattern being configured such that the first light distribution pattern and the second light distribution pattern are adjacent to each other or the first light distribution pattern and the second light distribution pattern at least partially overlap each other, and the first light and the second light being set in a relationship of complementary colors.

In the vehicular headlamp system according to the above configuration, the drawing pattern is constituted by the first light distribution pattern and the second light distribution pattern in the relationship of complementary colors to each other. Accordingly, a part drawn by either one of the light distribution patterns can be drawn so as to stand out by a part drawn by the other one of the light distribution patterns, for example. That is, a part drawn by the first light distribution pattern is drawn so as to stand out by a part drawn by the second light distribution pattern, and the part drawn by the second light distribution pattern is drawn so as to stand out by the part drawn by the first light distribution pattern. This makes it possible to improve visibility of a whole drawing pattern.

In the first aspect, the road surface drawing unit may include a first road surface drawing unit and a second road surface drawing unit provided in the pair of right and left headlamp units, respectively, and the road surface drawing unit may be configured such that the first road surface drawing unit emits the first light so as to form the first light distribution pattern and the second road surface drawing unit emits the second light so as to form the second light distribution pattern.

In the vehicular headlamp system according to the above configuration, the drawing pattern can be drawn on the road surface by simultaneously forming the first light distribution pattern and the second light distribution pattern. Hereby, in a case where the first light distribution pattern and the second light distribution pattern are set so as to at least partially overlap each other, it is possible to increase illuminance in an overlapping part of the first light distribution pattern and the second light distribution pattern.

In the first aspect, the road surface drawing unit may be constituted by a single road surface drawing unit provided in either one of the pair of right and left headlamp units, and the single road surface drawing unit may be configured to draw the drawing pattern on the road surface by forming the first light distribution pattern and the second light distribution pattern alternately.

In the vehicular headlamp system according to the above configuration, the first light distribution pattern and the second light distribution pattern are formed by the single road surface drawing unit, thereby making it possible to increase positioning accuracy of the first light distribution pattern and the second light distribution pattern in the drawing pattern.

In the first aspect, the first light distribution pattern may constitute a contour of the drawing pattern and the second light distribution pattern may constitute an inner part of the drawing pattern.

In the vehicular headlamp system according to the above configuration, the contour of the drawing pattern is constituted by the first light distribution pattern, and the inner part of the drawing pattern is constituted by the second light distribution pattern. Accordingly, in the drawing pattern, the contour and the inner part of the drawing pattern are in the relationship of complementary colors, thereby making it possible to draw the whole drawing pattern prominently. This accordingly makes it possible to further improve the visibility of the drawing pattern.

In the first aspect, the road surface drawing unit may be configured such that a wave length of the first light is shorter than a wave length of the second light.

In the vehicular headlamp system according to the above configuration, the wave length of the first light of the first light distribution pattern constituting the contour of the drawing pattern is set to be shorter than the wave length of the second light of the second light distribution pattern constituting the inner part of the drawing pattern. Here, generally, light in a region with a short wave length tends to be more intense to human eyes than light in a region with a long wave length. Because of this, by setting the wave length of the first light to be shorter than the wave length of the second light, it is possible to draw the contour of the drawing pattern in an emphasized manner. This accordingly makes it possible to effectively improve the visibility of the drawing pattern.

In the first aspect, the first light distribution pattern and the second light distribution pattern may be set so as to partially overlap each other.

In the vehicular headlamp system according to the above configuration, the first light distribution pattern and the second light distribution pattern are set so as to partially overlap each other. Since the first light forming the first light distribution pattern and the second light forming the second light distribution pattern have a relationship of complementary colors, their overlapping part is white. Because of this, the drawing pattern can be drawn in three colors. This makes it possible to further improve the visibility of the drawing pattern.

In the first aspect, the first light distribution pattern and the second light distribution pattern may be set so as to fully overlap each other.

In the vehicular headlamp system according to the above configuration, the first light distribution pattern and the second light distribution pattern are set so as to fully overlap each other. Since the first light forming the first light distribution pattern and the second light forming the second light distribution pattern have a relationship of complementary colors, the whole drawing pattern is white. On this account, it is possible to draw the drawing pattern with a high illuminance of the drawing pattern. This makes it possible to irradiate an irradiation object or the like with the drawing pattern so that the irradiation object stands out.

A control method of a vehicular headlamp according to a second aspect is a control method of a vehicular headlamp configured to draw a predetermined drawing pattern on a road surface on a front side relative to a vehicle by a first light distribution pattern and a second light distribution pattern formed by a road surface drawing unit, and includes: forming the first light distribution pattern by emitting first light by the road surface drawing unit; and forming the second light distribution pattern by emitting second light by the road surface drawing unit. The first light distribution pattern and the second light distribution pattern are set to be adjacent to each other or the first light distribution pattern and the second light distribution pattern are set to at least partially overlap each other, and the first light and the second light are set in a relationship of complementary colors.

In the control method of the vehicular headlamp according to the above configuration, a part drawn by either one of the light distribution patterns can be drawn so as to stand out by a part drawn by the other one of the light distribution patterns, for example. That is, a part drawn by the first light distribution pattern is drawn so as to stand out by a part drawn by the second light distribution pattern, and the part drawn by the second light distribution pattern is drawn so as to stand out by the part drawn by the first light distribution pattern. This makes it possible to improve the visibility of the whole drawing pattern.

In the second aspect, the road surface drawing unit may include a first road surface drawing unit and a second road surface drawing unit respectively provided in a pair of right and left headlamp units of a front end portion of a vehicle; in the forming the first light distribution pattern, the first light distribution pattern is formed by emitting the first light by the first road surface drawing unit; and in the forming the second light distribution pattern, the second light distribution pattern is formed by emitting the second light by the second road surface drawing unit.

In the control method of the vehicular headlamp according to the above configuration, the drawing pattern can be drawn on the road surface by simultaneously forming the first light distribution pattern and the second light distribution pattern. Hereby, in a case where the first light distribution pattern and the second light distribution pattern are set so as to partially overlap each other, it is possible to increase illuminance in an overlapping part of the first light distribution pattern and the second light distribution pattern.

In the second aspect, the road surface drawing unit may be a single road surface drawing unit provided in either one of a pair of right and left headlamp units of a front end portion of a vehicle, and the forming the first light distribution pattern and the forming the second light distribution pattern may be alternately repeated by the single road surface drawing unit such that the drawing pattern is drawn on the road surface.

In the control method of the vehicular headlamp according to the above configuration, the first light distribution pattern and the second light distribution pattern are formed by the single road surface drawing unit, thereby making it possible to increase positioning accuracy of the first light distribution pattern and the second light distribution pattern in the drawing pattern.

In the second aspect, in the forming the first light distribution pattern, a contour of the drawing pattern may be drawn by the first light distribution pattern, and in the forming the second light distribution pattern, an inner part of the drawing pattern may be drawn by the second light distribution pattern.

In the control method of the vehicular headlamp according to the above configuration, the contour and the inner part of the drawing pattern are in the relationship of complementary colors, thereby making it possible to draw the drawing pattern further prominently. This accordingly makes it possible to further improve the visibility of the drawing pattern.

In the second aspect, a wave length of the first light may be set to be shorter than a wave length of the second light.

In the control method of the vehicular headlamp according to the above configuration, the wave length of the first light is set to be shorter than the wave length of the second light. Here, generally, light in a region with a short wave length tends to be more intense to human eyes than light in a region with a long wave length. This accordingly makes it possible to draw the contour of drawing pattern in an emphasized manner. This accordingly makes it possible to effectively improve the visibility of the drawing pattern.

In the second aspect, the first light distribution pattern and the second light distribution pattern may be set so as to partially overlap each other.

In the control method of the vehicular headlamp according to the above configuration, the drawing pattern can be drawn in three colors. This makes it possible to further improve the visibility of the drawing pattern.

In the second aspect, the first light distribution pattern and the second light distribution pattern may be set so as to fully overlap each other.

In the control method of the vehicular headlamp according to the above configuration, it is possible to draw the drawing pattern with a high illuminance of the drawing pattern. This makes it possible to irradiate an irradiation object or the like with the drawing pattern so that the irradiation object stands out.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a table to describe color combinations of the drawing pattern illustrated in FIG. 1;

FIG. 5 is an explanatory view to describe a modification 1 of a drawing method of the drawing pattern illustrated in FIG. 1;

DETAILED DESCRIPTION OF EMBODIMENTS

Figure 1:
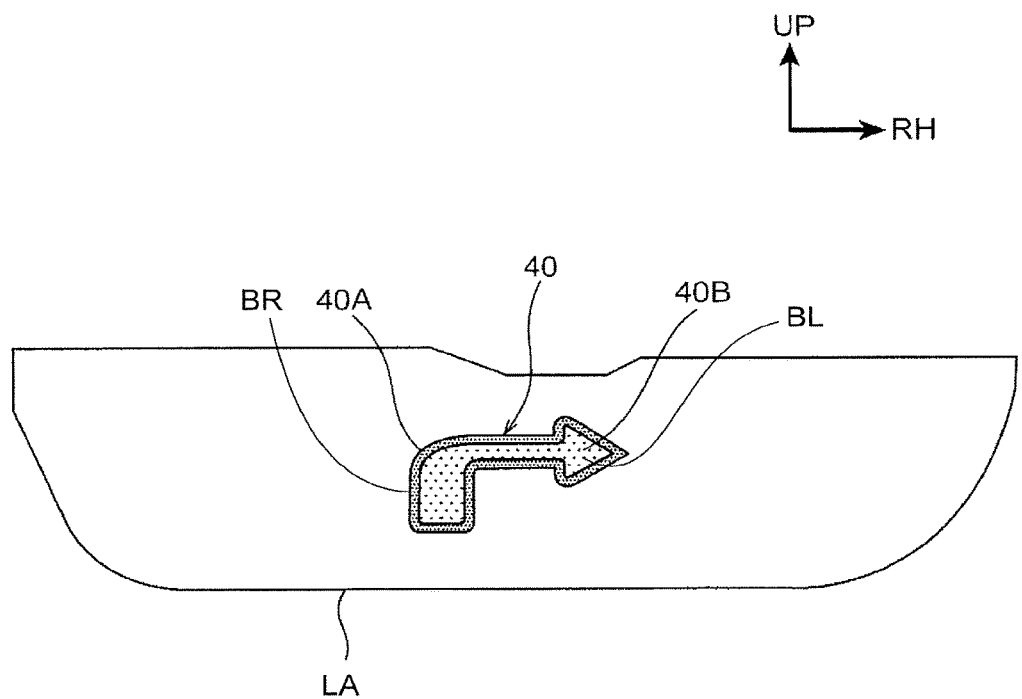
FIG. 1 is an explanatory view to describe a drawing pattern drawn by a road surface drawing unit in a vehicular headlamp to which a vehicular headlamp system according to the present embodiment is applied.

The following first describes a vehicular headlamp 10 to which a vehicular headlamp system S according to the present embodiment is applied, and then describes a drawing pattern 40 drawn by a road surface drawing unit 20 provided in the vehicular headlamp 10, with reference to the drawings. Note that an arrow UP and an arrow FR illustrated in the drawings indicate a vehicle upper side and a vehicle front side of a vehicle V equipped with the vehicular headlamp 10, respectively, and an arrow RH illustrated in the drawing indicates a vehicle right side in a state where the vehicle V faces a travelling direction. Hereinafter, in a case where a description is made by use of merely up/down directions, front/rear directions, and right/left directions, they indicate up and down of a vehicle up-down direction, front and rear of a vehicle front-rear direction, right and left of a vehicle right-left direction (a vehicle width direction), respectively, unless otherwise specified.

Figure 2:
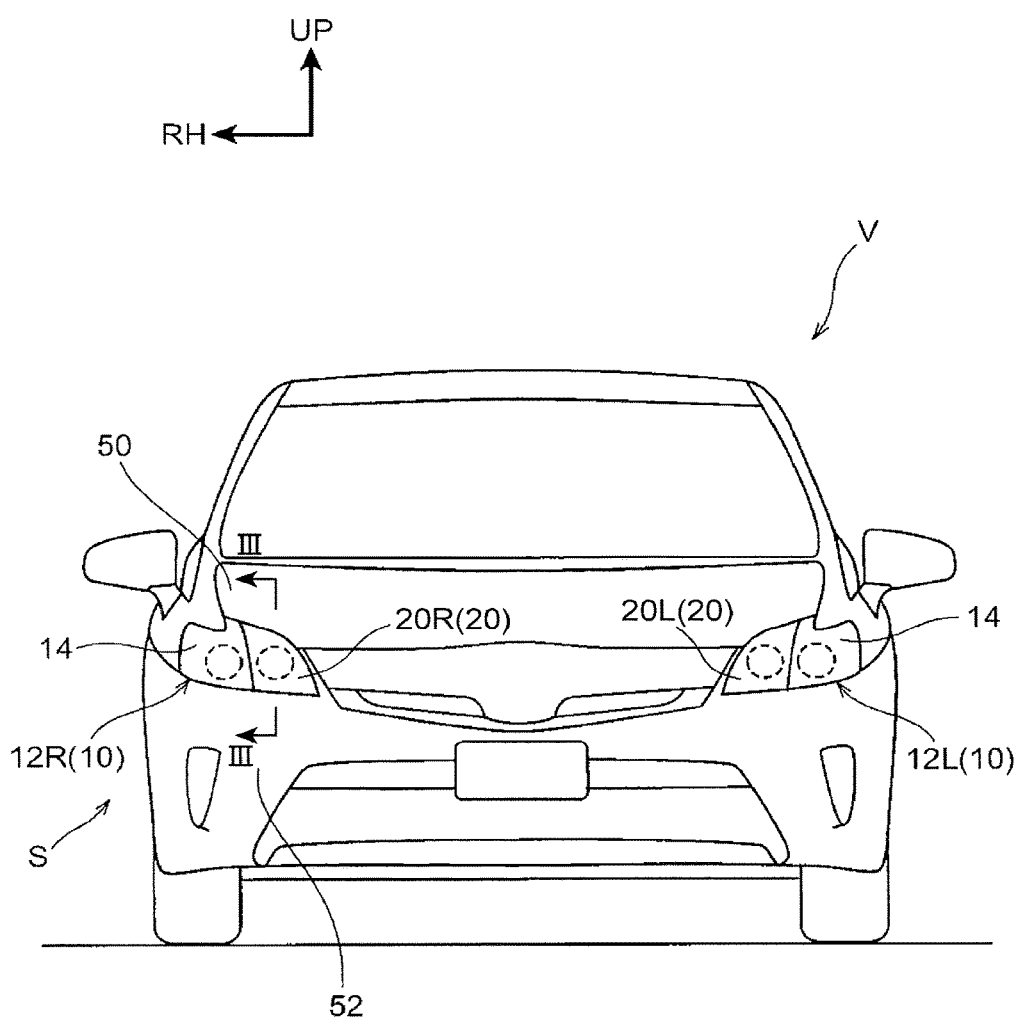
FIG. 2 is a front view illustrating a front portion of a vehicle equipped with the vehicular headlamp to which the vehicular headlamp system according to the present embodiment is applied.
Figure 3:
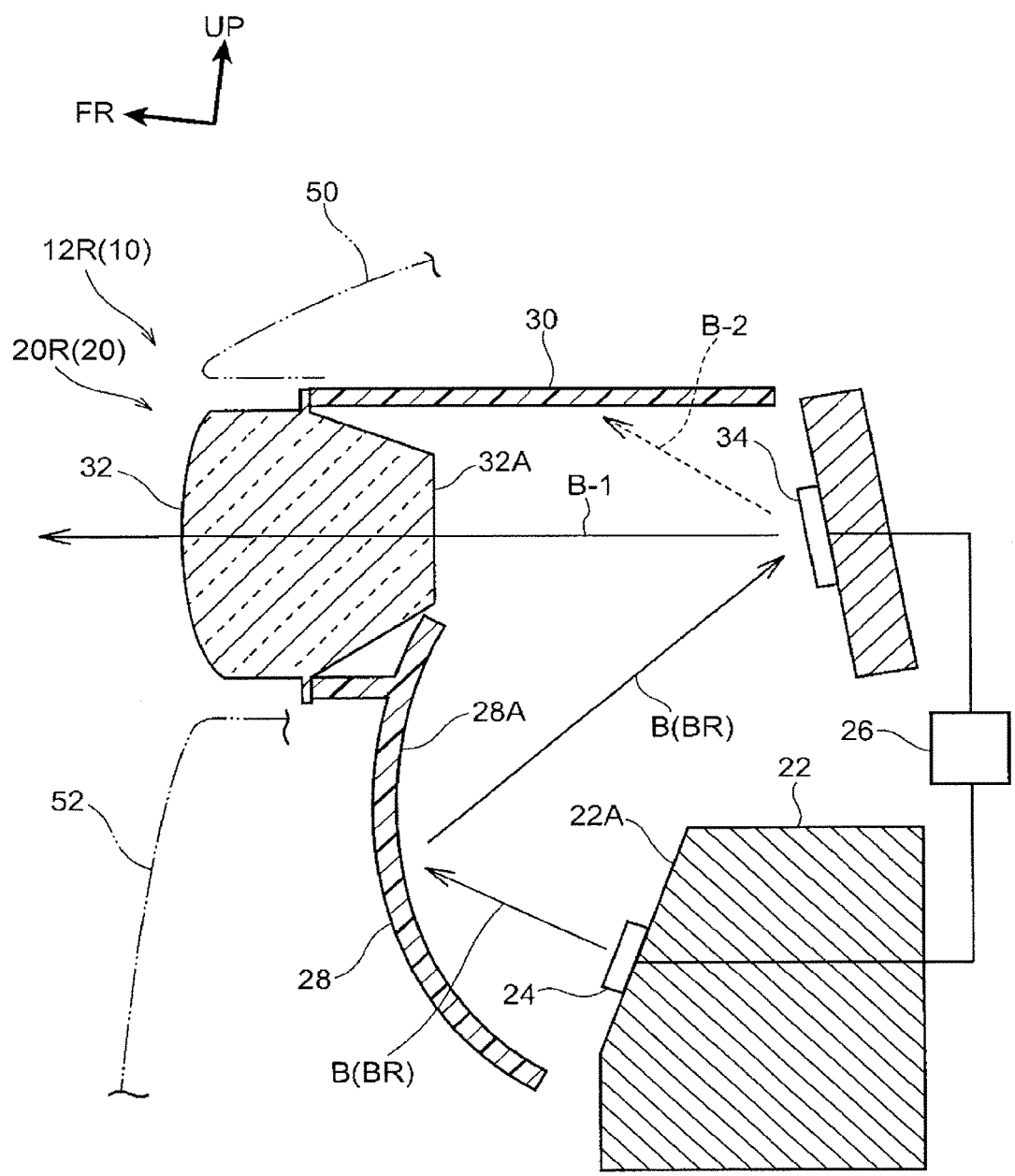
FIG. 3 is a sectional side view (a sectional view taken along a line in FIG. 2) when viewed from a vehicle central side, and illustrates the road surface drawing unit illustrated in FIG. 1.

As illustrated in FIG. 2, the vehicular headlamp 10 includes a pair of right and left headlamp units 12R, 12L. The headlamp unit 12R is placed in a right end of a front end portion of the vehicle V, and the headlamp unit 12L is placed in a left end of the front end portion of the vehicle V. Further, as illustrated in FIG. 3, a front end of a hood 50 for opening and closing an engine compartment of the vehicle V is placed above the headlamp units 12R, 12L. Further, lower parts of road surface drawing units 20 of the after-mentioned headlamp unit 12R, 12L are covered from a front side with a bumper cover 52 constituting the front end portion of the vehicle V. The headlamp units 12R, 12L are configured symmetrically on right and left sides in the vehicle width direction. In view of this, the following description about the configuration of the headlamp units 12R, 12L deals with the right headlamp unit 12R, and the description of the left headlamp unit 12L is omitted.

As illustrated in FIG. 2, the headlamp unit 12R includes a low/high-beam unit 14 constituting a vehicle-width outer part of the headlamp unit 12R, and the road surface drawing unit 20 constituting a vehicle-width inner part of the headlamp unit 12R.

The low/high-beam unit 14 has a light source (not show), and is configured to irradiate a front side relative to the vehicle V by the light source. The light source is configured as a light source for low-beam and high-beam. That is, the low/high-beam unit 14 is configured to switch between the low-beam mainly applied to a road surface region (a low-beam light distribution area LA) in front of the vehicle V and the high-beam mainly applied to a region (a high-beam light distribution area) on an upper side relative to the region to be irradiated with the low-beam. Note that, as the light source of the low/high-beam unit 14, a light-emitting diode (LED), a halogen lamp, a discharge lamp, a laser, or the like is used.

As illustrated in FIG. 3, the road surface drawing unit 20 is configured as a unit for drawing a predetermined drawing pattern 40 (see FIG. 1) on the road surface (more specifically, the low-beam light distribution area LA) on the front side relative to the vehicle V. Note that the drawing pattern 40 will be described later. The road surface drawing unit 20 includes a heat sink 22, a light source 24, a reflecting mirror 28, and a Micro Electro Mechanical system (MEMS) mirror 34.

The heat sink 22 constitutes a rear part of the road surface drawing unit 20 and is configured as a heat dissipation member that dissipates heat generated by the after-mentioned light source 24. The heat sink 22 is made of aluminum alloy or the like. The heat sink 22 is formed in a generally rectangular block shape in a side view, and is fixed to a housing (not shown) of the headlamp unit 12R at a position not illustrated herein. Further, a retention surface 22A for holding (fixing) the after-mentioned light source 24 is formed in an upper part on a front surface of the heat sink 22, and the retention surface 22A is inclined rearward as it goes upward in a side view.

The light source 24 is constituted by a plurality of high-luminance light sources such as light-emitting diodes (LED), semiconductor lasers (LD), or the like, and the light source 24 is electrically connected to a controlling portion 26. Hereby, light B of a predetermined color is emitted from the light source 24 by a control of the controlling portion 26. Further, the light source 24 is held by (fixed to) the retention surface 22A of the heat sink 22. As described above, the retention surface 22A is inclined rearward as it goes upward in a side view. Accordingly, the light B emitted from the light source 24 is projected forward and diagonally upward, and then incident on the after-mentioned reflecting mirror 28.

The reflecting mirror 28 is provided on the front side relative to the light source 24 and is covered with the bumper cover 52 of the vehicle V from the front side. The reflecting mirror 28 is formed in a plate shape curved forward in a projecting manner. Further, a rear face of the reflecting mirror 28 serves as a reflecting surface 28A, and the reflecting surface 28A is formed in a recessed curved shape opened rearward. The light B emitted from the light source 24 is reflected rearward and diagonally upward by the reflecting surface 28A, so that the light B thus reflected is incident on the after-mentioned MEMS mirror 34.

Further, a lens hold portion 30 that holds a lens 32 constituting a front end of the headlamp unit 12R is formed integrally on an upper side relative to the reflecting mirror 28. The lens hold portion 30 is formed in a generally tubular shape with its axial direction being along the front-rear direction, and a lower part of a front end of the lens hold portion 30 is connected to an upper front surface of the reflecting mirror 28. Further, a rear part (a part except the front end) of the lens hold portion 30 is opened downward, so that the light B reflected by the aforementioned reflecting mirror 28 is incident on the after-mentioned MEMS mirror 34 without interfering with the lens hold portion 30.

Further, the lens 32 is held by the lens hold portion 30, and the lens 32 is placed on the front side relative to the after-mentioned MEMS mirror 34. The lens 32 is held by the lens hold portion 30 in a state where a rear part of the lens 32 is accommodated inside the front end of the lens hold portion 30. Hereby, the bumper cover 52 of the vehicle V is placed on the lower side relative to the lens 32, and a hood 50 of the vehicle V is placed on the upper side relative to the lens 32.

A front surface of the lens 32 is curved so as to project forward in a side view from a lower end of the lens 32 to an upper end thereof. In the meantime, a rear face of the lens 32 is a protruding face 32A protruding rearward, and the protruding face 32A is formed in a generally U-shape opened forward in a side view. Hereby, the light B reflected forward by the after-mentioned MEMS mirror 34 is collected by the protruding face 32A, and the light B passes through the lens 32 so as to irradiate the front side relative to the vehicle V.

The MEMS mirror 34 is placed on the upper side relative to the aforementioned heat sink 22 and on the rear side relative to the lens 32, and is held by (fixed to) a housing (not shown) of the headlamp unit 12R. The MEMS mirror 34 is constituted by a plurality of micromovable mirrors arranged two-dimensionally, and each of the plurality of micromovable mirrors is formed on a semiconductor substrate by a semiconductor process. Further, the controlling portion 26 is electrically connected to the MEMS mirror 34, so that each of the micromovable mirrors is driven by a control of the controlling portion 26. When the micromovable mirrors are driven by the control of the controlling portion 26, angles of respective reflecting surfaces of the micromovable mirrors are changed, so that the micromovable mirrors enter an ON state or an OFF state. More specifically, when each of the micromovable mirrors enters the ON state, the light B incident on the each of the micromovable mirrors from the reflecting mirror 28 is reflected by the each of the micromovable mirrors (hereinafter the light thus reflected is referred to as "on-light B-1"), and the on-light B-1 is projected forward from the MEMS mirror 34 so as to pass through the lens 32. Hereby, the after-mentioned drawing pattern 40 is drawn by the on-light B-1 reflected by the micromovable mirrors in the ON state. Note that, in the following description, light emitted from the light source 24 of the headlamp unit 12R is referred to as first light BR, and light emitted from the light source 24 of the headlamp unit 12L is referred to as second light BL.

In the meantime, when each of the micromovable mirrors in the MEMS mirror 34 enters the OFF state, the light B incident on the each of the micromovable mirrors from the reflecting mirror 28 is reflected by the each of the micromovable mirrors (hereinafter the light thus reflected is referred to as "off-light B-2"), and the off-light B-2 thus reflected is reflected forward and diagonally upward from the MEMS mirror 34, so that the lens hold portion 30 is irradiated with the off-light B-2. Hereby, the off-light B-2 is absorbed by the lens hold portion 30 so as not to pass through the lens 32.

Next will be described the drawing pattern 40 drawn on the road surface by the road surface drawing unit 20. As illustrated in FIG. 1, the drawing pattern 40 is a figure or the like indicative of running information of the vehicle V on the low-beam light distribution area LA. Note that the drawing pattern 40 is exemplified as a figure of an arrow in FIG. 1, but a shape of the drawing pattern 40 can be changed appropriately by controlling the MEMS mirror 34 by the controlling portion 26, and for example, characters or the like may be displayed by the drawing pattern 40.

Further, the drawing pattern 40 is drawn by the road surface drawing units 20 provided in the pair of right and left headlamp units 12R, 12L. In other words, the road surface drawing units 20 include a right road surface drawing unit (a first road surface drawing unit) 20R provided in the headlamp unit 12R and a left road surface drawing unit (a second road surface drawing unit) 20L provided in the headlamp unit 12L. Note that, in the present embodiment, in a case where the right road surface drawing unit 20R is not distinguished from the left road surface drawing unit 20L, they may be described as the road surface drawing unit 20.

The right road surface drawing unit 20R forms a first light distribution pattern 40A that constitutes a part of the drawing pattern 40 by projecting forward the first light BR reflected by the MEMS mirror 34 provided in the headlamp unit 12R. In the meantime, the left road surface drawing unit 20L forms a second light distribution pattern 40B that constitutes the other part of the drawing pattern 40 by projecting forward the second light BL reflected by the MEMS mirror 34 provided in the headlamp unit 12L.

More specifically, in the drawing pattern 40 illustrated in FIG. 1, the first light distribution pattern 40A constitutes a contour of the drawing pattern 40, and the second light distribution pattern 40B constitutes an inner part (more specifically, a part inside an area irradiated with the first light distribution pattern 40A) of the drawing pattern 40. That is, a shape of the first light distribution pattern 40A is set to a frame shape corresponding to an outer shape of the drawing pattern 40, and a shape of the second light distribution pattern 40B is set to a similar figure to the drawing pattern 40. Hereby, the second light distribution pattern 40B is set to be adjacent to an inner side of the first light distribution pattern 40A.

Further, in the present embodiment, the first light BR forming the first light distribution pattern 40A and the second light BL forming the second light distribution pattern 40B are set to have a relationship of complementary colors. The complementary colors are a combination of colors having a relationship in which they are placed opposite to each other in a hue circle, and the first light BR and the second light BL have a combination of colors having a relationship in which they are placed opposite to each other in a hue circle. For example, as illustrated in FIG. 4, in a color combination pattern 1, the first light BR is set to blue and the second light BL is set to yellow. Further, for example, in a color combination pattern 2, the first light BR is set to green and the second light BL is set to magenta. Furthermore, for example, in a color combination pattern 3, the first light BR is set to cyan and the second light BL is set to red. In the present embodiment, the first light BR and the second light BL are set to a color combination of the color combination pattern 1, so as to draw the drawing pattern 40. That is, a wave length of the first light BR drawing the contour of drawing pattern 40 is set to be shorter than a wave length of the second light BL drawing the inner part of the drawing pattern 40. Note that the color combination patterns are examples, and other color combination patterns may be used. Further, in the color combination patterns, the colors of the first light BR and the second light BL may be replaced with each other.

An operation and an effect of the present embodiment are described below.

In the vehicular headlamp 10 configured as described above, the pair of right and left headlamp units 12R, 12L are provided with respective road surface drawing units 20. When the predetermined drawing pattern 40 is to be drawn on the road surface on the front side relative to the vehicle V, the light sources 24 and the MEMS mirrors 34 of the right and left road surface drawing units 20 are driven by a control of the controlling portion 26, so as to draw the predetermined drawing pattern 40 on the road surface.

More specifically, in the right road surface drawing unit 20R, the controlling portion 26 drives the light source 24 of the road surface drawing unit 20, so as to emit the first light BR. Hereby, the first light BR emitted from the light source 24 is reflected by the reflecting mirror 28 so as to be incident on the MEMS mirror 34. Further, the controlling portion 26 drives the micromovable mirrors in the MEMS mirror 34 of the right road surface drawing unit 20R, so that each of the micromovable mirrors enters an ON state or an OFF state so as to correspond to the first light distribution pattern 40A. Accordingly, when the first light BR is incident on the MEMS mirror 34, the first light BR corresponding to the first light distribution pattern 40A is reflected by the MEMS mirror 34 and passes through the lens 32 so as to be projected forward. Hereby, the first light distribution pattern 40A is formed by the right road surface drawing unit 20R, and thus, the contour of the predetermined drawing pattern 40 is drawn (a first drawing step).

In the meantime, in the left road surface drawing unit 20L, the controlling portion 26 drives the light source 24 of the road surface drawing unit 20 so as to emit the second light BL. Hereby, the second light BL emitted from the light source 24 is reflected by the reflecting mirror 28 so as to be incident on the MEMS mirror 34. Further, the controlling portion 26 drives the micromovable mirrors in the MEMS mirror 34 of the left road surface drawing unit 20L, so that each of the micromovable mirrors enters an ON state or an OFF state so as to correspond to the second light distribution pattern 40B. Accordingly, when the second light BL is incident on the MEMS mirror 34, the second light BL corresponding to the second light distribution pattern 40B is reflected by the MEMS mirror 34 and passes through the lens 32 so as to be projected forward. Hereby, the second light distribution pattern 40B is formed by the left road surface drawing unit 20L, and thus, the inner part of the predetermined drawing pattern 40 is drawn (a second drawing step).

Hereby, the predetermined drawing pattern 40 is drawn on the road surface by the first light distribution pattern 40A and the second light distribution pattern 40B (see FIG. 1). Thus, it is possible to notify a driver or a pedestrian of travelling information of the vehicle V or the like by the drawing pattern 40.

The first light BR emitted from the right road surface drawing unit 20R and the second light BL emitted from the left road surface drawing unit 20L are set to have a relationship of complementary colors. On this account, the drawing pattern 40 drawn on the road surface is drawn such that a part drawn by the first light distribution pattern 40A stands out by a part drawn by the second light distribution pattern 40B, and the part drawn by the second light distribution pattern 40B stands out by the part drawn by the first light distribution pattern 40A. This makes it possible to improve visibility of the whole drawing pattern 40.

Further, in the present embodiment, as described above, the color of the first light distribution pattern 40A and the color of the second light distribution pattern 40B are set to have a relationship of complementary colors, thereby improving the visibility of the whole drawing pattern 40. That is, by changing the colors of the first light BR and the second light BL, it is possible to improve the visibility of the whole drawing pattern 40. This makes it possible to restrain an increase in cost and to improve the visibility of the drawing pattern 40 with a simple configuration.

Further, the first light distribution pattern 40A formed by the right road surface drawing unit 20R constitutes the contour of the drawing pattern 40, and the second light distribution pattern 40B formed by the left road surface drawing unit 20L constitutes the inner part of the drawing pattern 40. Hereby, in the drawing pattern 40, the contour and the inner part of the drawing pattern 40 are drawn in the relationship of complementary colors, thereby making it possible to draw the drawing pattern 40 more prominently. This accordingly makes it possible to further improve the visibility of the drawing pattern 40.

Further, the wave length of the first light BR forming the first light distribution pattern 40A is set to be shorter than the wave length of the second light BL forming the second light distribution pattern 40B. Here, generally, light in a region with a short wave length tends to be more intense to human eyes than light in a region with a long wave length. On this account, when the wave length of the first light BR forming the first light distribution pattern 40A, which is the contour of the drawing pattern 40, is set to be shorter than the wave length of the second light BL forming the second light distribution pattern 40B, it is possible to draw the contour of drawing pattern 40 in an emphasized manner. This accordingly makes it possible to effectively improve the visibility of the whole drawing pattern 40.

Note that, in the present embodiment, the first light distribution pattern 40A constitutes the contour of the drawing pattern 40, and the second light distribution pattern 40B constitutes the inner part of the drawing pattern 40, as described above. However, a drawing method of the drawing pattern 40 by the first light distribution pattern 40A and the second light distribution pattern 40B is not limited to this. The following describes modifications of the drawing method by the first light distribution pattern 40A and the second light distribution pattern 40B.

Modification 1

As illustrated in FIG. 5, in Modification 1, a first light distribution pattern 40A and a second light distribution pattern 40B wholly overlap each other so as to draw a generally rectangular drawing pattern 40. That is, a shape of the first light distribution pattern 40A is set to the same shape (rectangle) as the drawing pattern 40, and a shape of the second light distribution pattern 40B is also set to the same shape (rectangle) as the drawing pattern 40. The first light distribution pattern 40A and the second light distribution pattern 40B are formed simultaneously by the right and left road surface drawing units 20R, 20L, so as to draw the drawing pattern 40 on a road surface. Further, since first light BR forming the first light distribution pattern 40A and second light BL forming the second light distribution pattern 40B are set to have a relationship of complementary colors, the drawing pattern 40 is white in the drawing method of Modification 1. On this account, the drawing pattern 40 can be drawn in a low-beam light distribution area LA with high illuminance light. This makes it possible to irradiate an irradiation object inside the low-beam light distribution area LA with the drawing pattern 40 so that the irradiation object stands out, for example. Note that Modification 1 deals with an example in which the drawing pattern 40 is formed in a generally rectangular shape, but the shape of the drawing pattern 40 is modifiable appropriately. For example, in order to urge a pedestrian to stop crossing a road, characters of "STOP" or the like may be drawn by the drawing pattern 40 of the drawing method of Modification 1. Further, for example, in order to urge a pedestrian to cross a road, marks of zebra zone, arrow, or the like may be drawn by the drawing pattern 40 of the drawing method of Modification 1. Hereby, it is possible to draw information to a driver, a pedestrian, or the like in an emphasized manner by the drawing pattern 40 in the low-beam light distribution area LA.

Further, as described above, in the present embodiment, the first light distribution pattern 40A is formed by the right road surface drawing unit 20R and the second light distribution pattern 40B is formed by the left road surface drawing unit 20L. On this account, the first light distribution pattern 40A and the second light distribution pattern 40B can be formed simultaneously by the pair of right and left road surface drawing units 20R, 20L. When the first light distribution pattern 40A and the second light distribution pattern 40B are formed simultaneously as such, it is possible draw the drawing pattern 40 like the one in Modification 1 on the road surface.

Modification 2

Figure 6A:
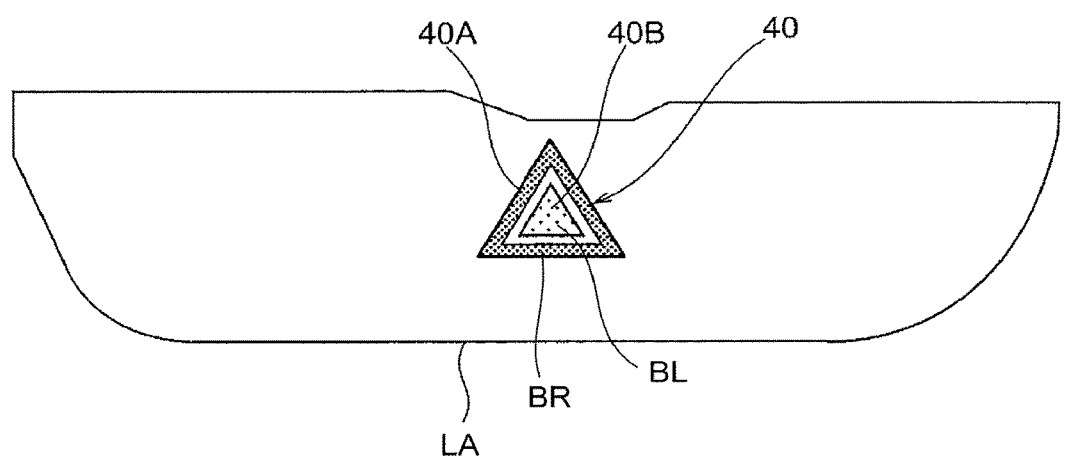
FIG. 6A is an explanatory view to describe a modification 2 of the drawing method of the drawing pattern illustrated in FIG. 1.
Figure 6B:
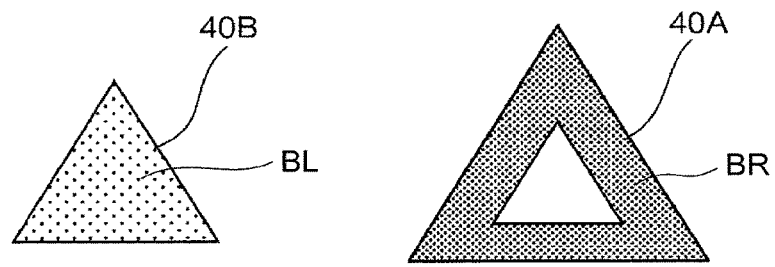
FIG. 6B is an explanatory view to describe a first light distribution pattern and a second light distribution pattern illustrated in FIG. 6A.

As illustrated in FIG. 6A, in Modification 2, a drawing pattern 40 is a generally triangular drawing pattern. A first light distribution pattern 40A constitutes a contour of the drawing pattern 40, and a second light distribution pattern 40B constitutes an inner part of the drawing pattern 40. That is, a shape of the first light distribution pattern 40A is set to a frame shape corresponding to an outer shape of the drawing pattern 40, and a shape of the second light distribution pattern 40B is set to a similar figure to the drawing pattern 40. Further, as illustrated in FIG. 6B, in Modification 2, a size of the second light distribution pattern 40B is set to be larger than a size of an inner region of the first light distribution pattern 40A. That is, in the drawing pattern 40 drawn by a drawing method of Modification 2, an inner part of the first light distribution pattern 40A and an outer part of the second light distribution pattern 40B are set to overlap each other. Since first light BR forming the first light distribution pattern 40A and second light BL forming the second light distribution pattern 40B are set to have a relationship of complementary colors, a part where the first light distribution pattern 40A and the second light distribution pattern 40B overlap each other is white (see a blank region in FIG. 6A). On this account, in Modification 2, a light distribution (color) of the drawing pattern 40 is constituted by three colors. Hereby, in comparison with the present embodiment described above which is constituted by two colors, the drawing pattern 40 can be drawn with various colors, thereby making it possible to further improve the visibility of the drawing pattern 40.

Modification 3

Figure 7:
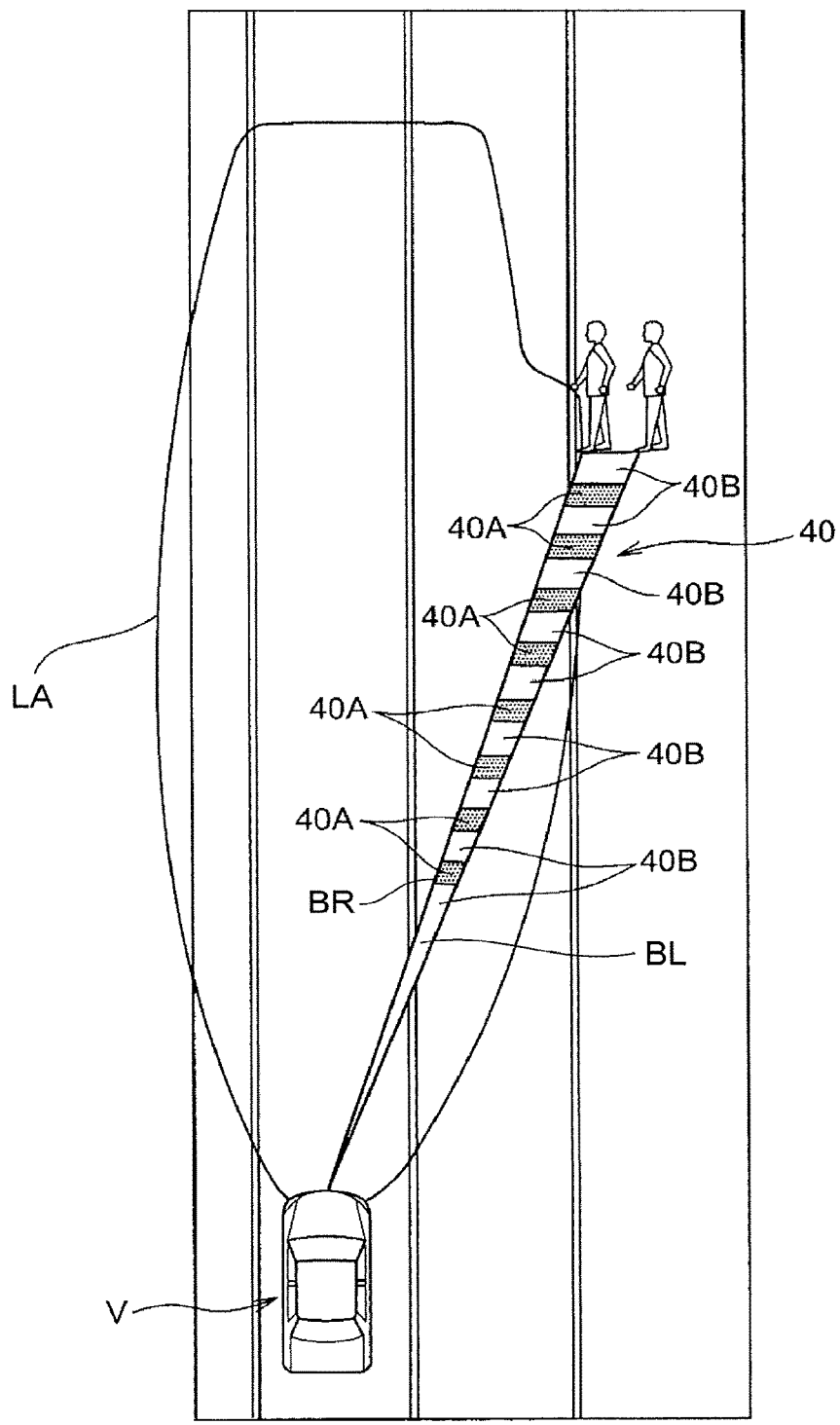
FIG. 7 is an explanatory view to describe a modification 3 of the drawing method of the drawing pattern illustrated in FIG. 1.

As illustrated in FIG. 7, in Modification 3, a drawing pattern 40 is constituted by a plurality of first light distribution patterns 40A and a plurality of second light distribution patterns 40B. More specifically, the drawing pattern 40 is a generally belt-shaped drawing pattern that connects an obstacle such as a pedestrian to a vehicle V. In the drawing pattern 40, the first light distribution patterns 40A and the second light distribution patterns 40B are set so as to be arranged alternately in a longitudinal direction of the drawing pattern 40. That is, the first light distribution patterns 40A and the second light distribution patterns 40B are arranged adjacent to each other in the longitudinal direction of the drawing pattern 40. Further, a width dimension of the drawing pattern 40 is set so as to become larger as the drawing pattern 40 is distanced from the vehicle V. Hereby, it is possible to successfully notify a driver of existence of the obstacle such as the pedestrian, and it is also possible to successfully notify the pedestrian of approach of the vehicle.

Further, in the present embodiment and Modifications 1 to 3, the first light distribution pattern(s) 40A and the second light distribution pattern(s) 40B are drawn simultaneously in the drawing pattern 40 (that is, the whole drawing pattern 40 is lighted and displayed). Alternatively, the whole drawing pattern 40 may be configured to be blinkingly displayed by turning on/off operations of the right and left road surface drawing units 20 by the controlling portion 26. Further, the first light distribution pattern 40A and the second light distribution pattern 40B may be blinkingly displayed alternately by shifting operation timings of the right and left road surface drawing units 20 by the controlling portion 26. Further, in a case where the drawing pattern 40 is constituted by the plurality of first light distribution patterns 40A and second light distribution patterns 40B such as Modification 3, the first light distribution patterns 40A and the second light distribution patterns 40B may be turned on sequentially from the vehicle V to its front side by alternately operating the right and left road surface drawing units 20 by the controlling portion 26. Hereby, the drawing pattern 40 is drawn dynamically, thereby making it possible to increase recognition of the driver or the pedestrian for the drawing pattern 40. Further, the first light distribution pattern 40A and the second light distribution pattern 40B may both include parts placed so as to adjacent to each other and parts placed so as to partially overlap each other.

In the above embodiment, the controlling portion 26 is configured to operate the right and left road surface drawing units 20 so as to draw the drawing pattern 40. However, the controlling portion 26 may be configured to operate one of the road surface drawing units 20 so that the drawing pattern 40 is drawn by a single road surface drawing unit 20. The following describes a configuration of the road surface drawing unit 20 and a control of the controlling portion 26 in this case.

In this case, the road surface drawing unit 20 includes a light module, and the light module includes, for example, three light sources of RGB. Further, the light module includes a synthetic portion for combining light beams emitted from the three light sources of RGB. The light beams emitted from the three light sources of RGB or synthetic light obtained by combining the light beams emitted from the three light sources of RUB are/is projected toward the reflecting mirror 28 from the light module.

When the drawing pattern 40 is drawn on the road surface, the controlling portion 26 drives the light sources of the light module and the MEMS mirror 34 so as to form the first light distribution pattern 40A and the second light distribution pattern 40B.

More specifically, in order to emit the first light BR corresponding to the first light distribution pattern 40A, the controlling portion 26 drives some of or all of the three light sources of RGB of the road surface drawing unit 20 (e.g., in a case where the first light BR is blue like the present embodiment, the light source of B (blue) is driven). Hereby, the first light BR emitted from the light module is reflected by the reflecting mirror 28 so as to be incident on the MEMS mirror 34. Further, the controlling portion 26 drives the micromovable mirrors in the MEMS mirror 34, so that each of the micromovable mirrors in the MEMS mirror 34 enters an ON state or an OFF state so as to correspond to the first light distribution pattern 40A. Accordingly, when the first light BR is incident on the MEMS mirror 34, the first light BR corresponding to the first light distribution pattern 40A is reflected by the MEMS mirror 34 and passes through the lens 32 so as to be projected forward. Hereby, the first light distribution pattern 40A is formed, and thus, the contour of the predetermined drawing pattern 40 is drawn (a first drawing step).

Further, in order to emit the second light BL corresponding to the second light distribution pattern 40B after the first drawing step, the controlling portion 26 drives some of or all of the three light sources of RGB of the road surface drawing unit 20 (e.g., in a case where the second light BL is yellow like the present embodiment, the light sources of G (green) and R (red) is driven). Hereby, the second light BL emitted from the light module is reflected by the reflecting mirror 28 so as to be incident on the MEMS mirror 34. Further, the controlling portion 26 drives the micromovable mirrors in the MEMS mirror 34, so that each of the micromovable mirrors in the MEMS mirror 34 enters an ON state or an OFF state so as to correspond to the second light distribution pattern 40B. Accordingly, when the second light BL is incident on the MEMS mirror 34, the second light BL corresponding to the second light distribution pattern 40B is reflected by the MEMS mirror 34 and passes through the lens 32 so as to be projected forward. Hereby, the second light distribution pattern 40B is formed, and thus, the inner part of the predetermined drawing pattern 40 is drawn (a second drawing step).

When the controlling portion 26 repeatedly performs the first drawing step and the second drawing step every predetermined time (e.g., every five msec), the whole drawing pattern 40 is drawn visibly to a driver, a pedestrian, or the like. Hereby, even in a case where the drawing pattern 40 is drawn by a single road surface drawing unit 20, it is possible to improve the visibility of the drawing pattern 40.

Further, in a case where the drawing pattern 40 is drawn by either one of the road surface drawing units 20, the first light distribution pattern 40A and the second light distribution pattern 40B are formed by a single road surface drawing unit 20. On this account, it is possible to draw the drawing pattern 40 on the road surface while increasing positioning accuracy of the first light distribution pattern 40A and the second light distribution pattern 40B.

Further, in a case where the drawing pattern 40 is drawn by either one of the road surface drawing units 20, another drawing pattern 40 may be drawn by the other one of the road surface drawing units 20. Hereby, many pieces of information in the vehicle V can be drawn on the road surface by the road surface drawing units 20.

Further, in a case where the road surface drawing unit 20 for forming two light distribution patterns 40A, 40B is provided as described above, the road surface drawing unit 20 may be provided in each of the right and left headlamp units 12R, 12L. At this time, for example, when the first light distribution pattern 40A is formed by the right road surface drawing unit 20R, the second light distribution pattern 40B may be formed by the left road surface drawing unit 20L, and when the second light distribution pattern 40B is formed by the left road surface drawing unit 20L, the first light distribution pattern 40A may be formed by the right road surface drawing unit 20R.

Further, in the present embodiment, the first light distribution pattern 40A is formed by the right road surface drawing unit 20R and the second light distribution pattern 40B is formed by the left road surface drawing unit 20L. Alternatively, the second light distribution pattern 40B may be formed by the right road surface drawing unit 20R, and the first light distribution pattern 40A may be formed by the left road surface drawing unit 20L.

Further, in the present embodiment, the road surface drawing unit 20 includes the light source 24, the reflecting mirror 28, and the MEMS mirror 34, but the configuration of the road surface drawing unit is not limited to this. For example, the road surface drawing unit may be constituted by a light source and a rotary reflector, and a predetermined light distribution pattern may be formed such that light emitted from the light source is reflected by a reflecting surface of the rotary reflector while the rotary reflector is being rotated. Further, for example, the road surface drawing unit may be configured as a so-called liquid-crystal type unit (i.e., a projector type) road surface drawing unit including a light source and a liquid crystal shutter, and a predetermined light distribution pattern may be formed by operating the liquid crystal shutter. Further, for example, the road surface drawing unit may be configured as a so-called LED-array road surface drawing unit including a plurality of light sources of LEDs, and a predetermined light distribution pattern may be formed by light emitted from the plurality of LEDs.

What is claimed is:
1. A vehicular headlamp system comprising:
a pair of right and left headlamp units provided in a front end portion of a vehicle; and
a road surface drawing unit provided in at least one of the pair of right and left headlamp units, the road surface drawing unit including reflecting surfaces configured to be driven to reflect first light so as to form a first light distribution pattern and to reflect second light so as to form a second light distribution pattern such that a predetermined drawing pattern is drawn on a road surface on a front side relative to the vehicle by the first light distribution pattern and the second light distribution pattern, wherein
the drawing pattern is configured such that the first light distribution pattern and the second light distribution pattern are adjacent to each other or the first light distribution pattern and the second light distribution pattern at least partially overlap each other,
the first light exiting the road surface drawing unit is entirely a first color,
the second light exiting the road surface drawing unit is entirely a second color, and
the first color and the second color are set in a relationship of complementary colors.
2. The vehicular headlamp system according to claim 1, wherein:
the road surface drawing unit includes a first road surface drawing unit and a second road surface drawing unit provided in the pair of right and left headlamp units, respectively;

the first road surface drawing unit includes a first plurality of the reflecting surfaces configured to be driven to reflect the first light so as to form the first light distribution pattern; and the second road surface drawing unit includes a second plurality of the reflecting surfaces configured to be driven to reflect the second light so as to form the second light distribution pattern.

3. The vehicular headlamp system according to claim 1, wherein the road surface drawing unit is constituted by a single road surface drawing unit including the reflecting surfaces and provided in either one of the pair of right and left headlamp units; and the single road surface drawing unit is configured to draw the drawing pattern on the road surface by forming the first light distribution pattern and the second light distribution pattern alternately.

4. The vehicular headlamp system according to claim 1, wherein the first light distribution pattern constitutes a contour of the drawing pattern, and the second light distribution pattern constitutes an inner part of the drawing pattern.

5. The vehicular headlamp system according to claim 4, wherein a wavelength of the first light is shorter than a wavelength of the second light.

6. The vehicular headlamp system according to claim 2, wherein the first light distribution pattern and the second light distribution pattern are placed so as to partially overlap each other.

7. The vehicular headlamp system according to claim 2, wherein the first light distribution pattern and the second light distribution pattern are placed so as to fully overlap each other.

8. A control method of a vehicular headlamp configured to draw a predetermined drawing pattern on a road surface on a front side relative to a vehicle by a first light distribution pattern and a second light distribution pattern formed by a road surface drawing unit, the control method comprising:

forming the first light distribution pattern by driving reflecting surfaces in the road surface drawing unit to reflect first light; and forming the second light distribution pattern by driving the reflecting surfaces in the road surface drawing unit to reflect second light, wherein the first light distribution pattern and the second light distribution pattern are set to be adjacent to each other or the first light distribution pattern and the second light distribution pattern are set to at least partially overlap each other; and the first light exiting the road surface drawing unit is entirely a first color, the second light exiting the road surface drawing unit is entirely a second color, and the first color and the second color are set in a relationship of complementary colors.

9. The control method according to claim 8, wherein the road surface drawing unit includes a first road surface drawing unit including a first plurality of the reflecting surfaces and a second road surface drawing unit including a second plurality of the reflecting surfaces respectively provided in a pair of right and left headlamp units of a front end portion of a vehicle;

in the forming the first light distribution pattern, the first light distribution pattern is formed by driving the first plurality of the reflecting surfaces to reflect the first light; and in the forming the second light distribution pattern, the second light distribution pattern is formed by driving the second plurality of the reflecting surfaces to reflect the second light.

10. The control method according to claim 8, wherein the road surface drawing unit is a single road surface drawing unit including the reflecting surfaces and provided in either one of a pair of right and left headlamp units of a front end portion of a vehicle; and the forming the first light distribution pattern and the forming the second light distribution pattern are alternately repeated by the single road surface drawing unit such that the drawing pattern is drawn on the road surface.

11. The control method according to claim 8, wherein a contour of the drawing pattern is drawn by the first light distribution pattern; and an inner part of the drawing pattern is drawn by the second light distribution pattern.

12. The control method according to claim 11, wherein a wavelength of the first light is set to be shorter than a wavelength of the second light.

13. The control method according to claim 9, wherein the first light distribution pattern and the second light distribution pattern are set so as to partially overlap each other.

14. The control method according to claim 9, wherein the first light distribution pattern and the second light distribution pattern are set so as to fully overlap each other.

15. The vehicular headlamp system according to claim 1, wherein the reflecting surfaces include a plurality of micromovable mirrors arranged two-dimensionally on a semiconductor substrate.

16. The vehicular headlamp system according to claim 15, wherein the plurality of micromovable mirrors arranged two-dimensionally on the semiconductor substrate constitute a Micro Electro Mechanical system (MEMS) mirror.

17. The vehicular headlamp system according to claim 1, wherein the reflecting surfaces are driven such that angles thereof are changed between and an ON state and an OFF state.

18. The vehicular headlamp system according to claim 17, wherein the ON state includes reflecting light in a direction such that the reflected light leaves the at least one of the pair of right and left headlamp units; and the OFF state includes reflecting light in a direction such that the reflected light does not leave the at least one of the pair of right and left headlamp units.

19. The vehicular headlamp system according to claim 1, wherein the first light distribution pattern includes a plurality of the first light distribution pattern; and the second light distribution pattern includes a plurality of the second light distribution pattern.

20. The vehicular headlamp system according to claim 19, wherein the first light distribution patterns and the second light distribution patterns are set so as to be arranged alternately in a longitudinal direction of the drawing pattern, and a width dimension of the drawing pattern is set so as to become larger as the drawing pattern is distanced from the vehicle.

* * * * *